G. W. Smith,
Drain Tile,
N° 45,089. Patented Nov. 15, 1864.

Witnesses
Chas B. Celfenstein
Edward Brown

Inventor.
George W. Smith

UNITED STATES PATENT OFFICE.

GEORGE W. SMITH, OF SPRINGFIELD TOWNSHIP, NEW JERSEY.

DRAIN.

Specification forming part of Letters Patent No. 45,089, dated November 15, 1864.

*To all whom it may concern:*

Be it known that I, GEORGE W. SMITH, of Springfield Township, Burlington county, New Jersey, have invented a new and useful improvement in drains for agricultural and other purposes, for which Letters Patent of the United States were granted to me on the 9th of February, 1864; and I do hereby declare that the following is a full, clear, and exact description of the construction and operation of the same, reference being had to the annexed drawings, making a part hereof, in which—

Figures 1, 2:
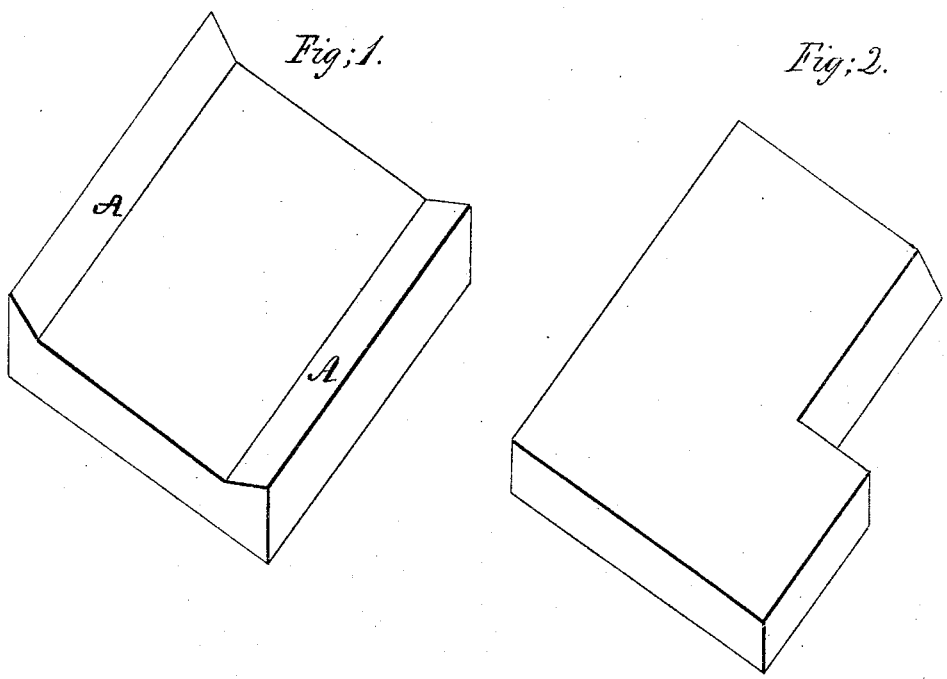
Figure 3:
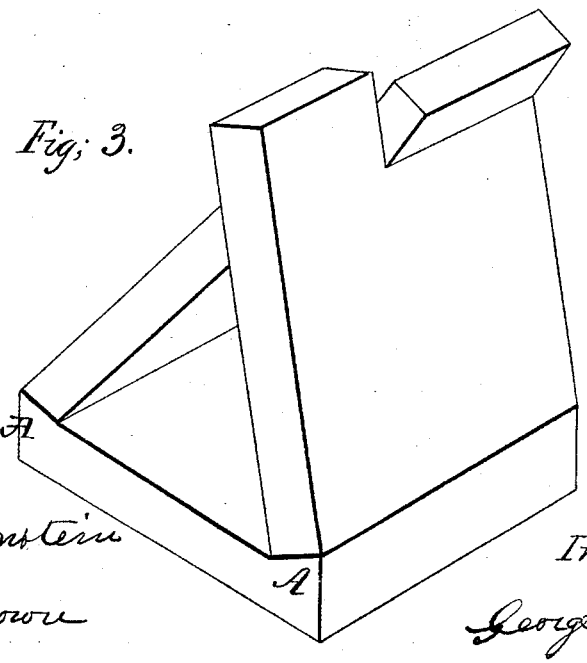

Figures 1 and 2 are views of the detached pieces or slabs; Fig. 3, the pieces put together.

My improvement consists in forming cleats A on the bottom slabs, and in cutting out the side slabs where they come together at the top, so that they may lock, as is shown in Fig. 3.

The cleats cost less in construction than the grooves described in the specification of my above-named Letters Patent.

My improvement makes it more easy to construct the drain, since the side-slabs are less liable to be displaced before they are covered up with earth.

What I claim, and desire to secure by Letters Patent, is—

A new article of manufacture is the combination of the bottom slabs with the cleats A, and the side-slabs cut out so as to lock when set up, in the manner and for the purpose substantially as shown and described.

GEORGE W. SMITH.

Witnesses:
   JOHN E. SHAW,
   CHAS. B. HELFENSTEIN.